Jan. 28, 1947.     O. F. LOHSE     2,414,958
JACKING DEVICE FOR HARVESTER REELS AND THE LIKE
Filed June 16, 1943     2 Sheets-Sheet 1
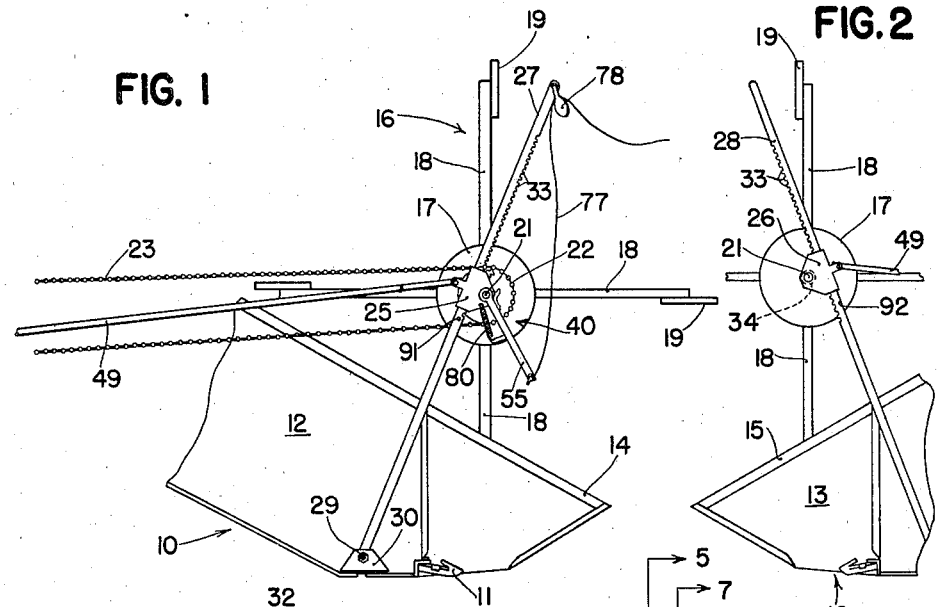
INVENTOR.
ORA F. LOHSE
ATTORNEYS Jan. 28, 1947. O. F. LOHSE 2,414,958
JACKING DEVICE FOR HARVESTER REELS AND THE LIKE
Filed June 16, 1943 2 Sheets-Sheet 2
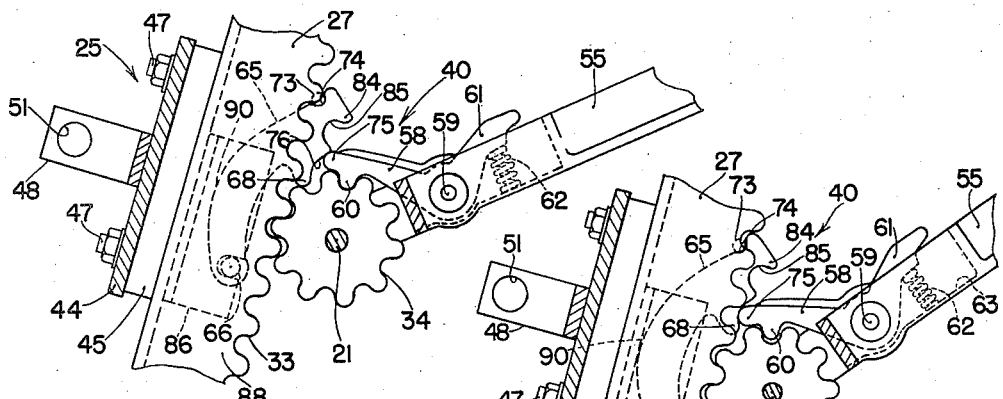
FIG. 5
FIG. 6
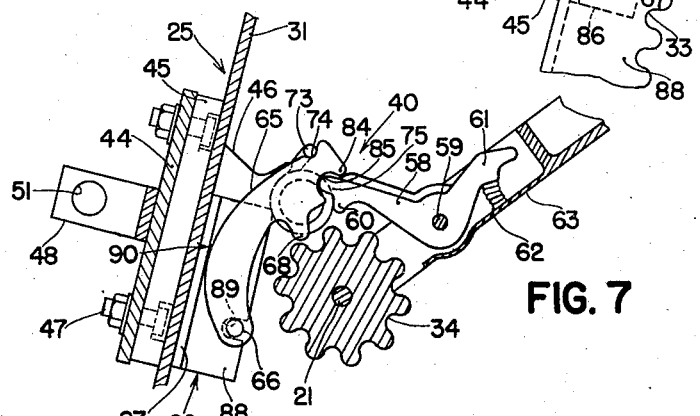
FIG. 7
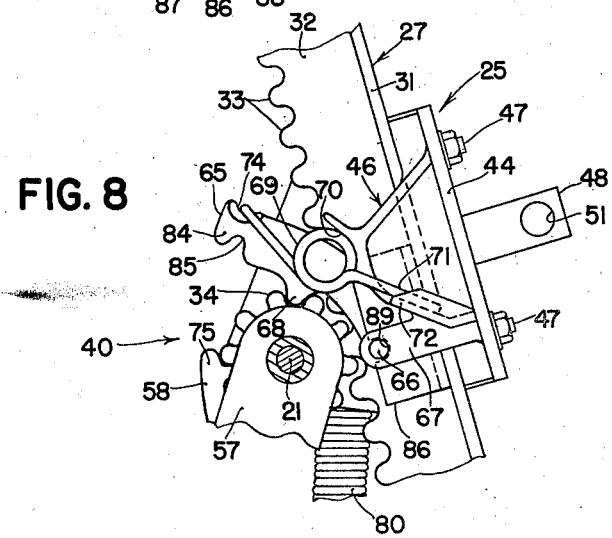
FIG. 8
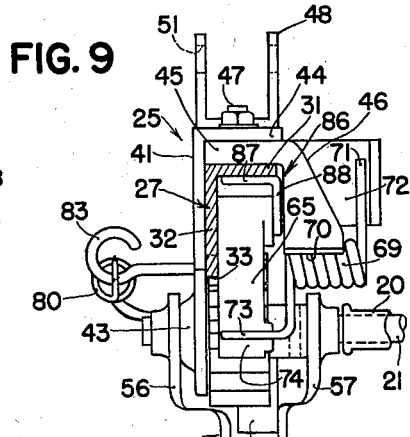
FIG. 9
INVENTOR.
ORA F. LOHSE
ATTORNEYS Patented Jan. 28, 1947

2,414,958

UNITED STATES PATENT OFFICE 2,414,958

JACKING DEVICE FOR HARVESTER REELS AND THE LIKE

Ora F. Lohse, Helena, Mont., assignor to Deere & Company, Moline, Ill., a corporation of Illinois Application June 16, 1943, Serial No. 491,265

20 Claims. (Cl. 74—111)

The present invention relates generally to jacking devices, with particular reference to devices for raising and lowering harvester reels relative to the harvester platform, and has for its principal object the provision of a novel and improved means for controlling the height of the reel above the harvester platform from a remote operating position, such as the operator's station on a tractor. Broadly, remote controlled mechanisms for vertically adjusting harvester reels are not new. Heretofore, this has been accomplished either by a system of cranks and levers extending from the forward end of the harvester draft member back to the reel support, or rope-controlled latch mechanisms, in which a rope extends from the tractor operator's position over a pulley on the reel supporting standard, to a latch on the reel supporting member, the latch serving to secure the reel to its supporting standard in vertically adjusted position. A pull on the rope first releases the latch and then raises the reel. The first mentioned class of reel adjusting devices is comparatively expensive and complicated, while the rope-controlled devices heretofore available, are difficult to operate, since the operator must raise the entire weight of the reel directly by pulling on the rope. One object of the present invention relates to the provision of a simple and inexpensive rope-controlled reel adjusting mechanism which provides for a mechanical advantage between the rope and the reel in order that the operator does not have to lift the full weight of the reel directly when raising the latter. Specifically, it is an object of the present invention to provide a jacking mechanism, operable by a rope or the like from a remote position, by means of which the reel can be raised in increments by successive pulls on the rope.

Another general object of the present invention relates to the provision of jacking mechanism that can be either raised or lowered by pulling on the actuating lever in one direction, in order that complete control of the mechanism may be had through a rope or the like. In the accomplishment of this object, I support the reel shaft on a pair of pinions, which roll along a pair of rack bars, and provide a jacking lever for rotating the pinions along the racks. A pair of ratchet pawls are pivotally mounted on the lever and on the reel support which is slidable along the rack bar, for rotating and locking one of the pinions during reciprocative movement of the control lever in opposite directions, respectively. The two pawls are interengageable, responsive to a pull on the lever or rope, for raising both pawls away from engagement with the pinion, thus freeing the latter so that the reel drops by its own weight.

Still another object of my invention relates to the provision of braking means, also actuated through the control rope and having a mechanical advantage so that the full weight of the reel is not sustained by the operator when lowering the reel any more than when raising the latter. In the accomplishment of this object, a brake shoe is connected to one of the pawls in such a manner that pressure is applied upon the brake shoe when the pawls are interengaged and lifted out of engagement with the pinion. Still another object has to do with the provision of a novel arrangement of pawls and pinion, in which the two pawls do not immediately interengage for releasing the pinion, at the end of each stroke of the lever, but are so arranged that the lever must be actuated to the end of its stroke, then released and allowed to return a short distance in order to interengage the two pawls. After the pawls are engaged, the lever can then be actuated by pulling on the rope, to disengage the pawls from the pinion and to exert a force upon the brake shoe for the purpose of holding the reel against dropping. The reel can then be lowered gradually by slightly releasing the tension on the rope, and when it reaches the desired position of adjustment, the reel can be locked in that position by completely releasing the rope and thereby allowing the locking pawl to lock the reel in position.

These and other objects and advantages of my invention will be apparent to those skilled in the art after a consideration of the following description of the preferred embodiment, reference being had to the drawings appended hereto, in which Figure 1 is a side elevational view of the forward end of a harvester platform and reel, having an adjusting device embodying the principles of my invention;

Figure 2 is a side elevational view of the other end of the reel shaft;

Figure 3 is a side elevational view of the jacking device, drawn to an enlarged scale;

Figure 4 is a front elevational view of the jacking device;

Figure 5 is a sectional elevational view taken along a line 5—5 in Figure 4 and showing the jacking mechanism in a position in which the lever is in its upper range of movement during lifting operation;

Figure 6 is a similar view showing the lever at its upper limit of movement;

Figure 7 is a sectional elevation taken along a line 7—7 of Figure 4 and showing the lever in a position for lowering the reel;

Figure 8 is a side elevational view of the opposite side of the jacking device; and Figure 9 is a top plan view taken along a line 9—9 in Figure 4.

Referring now to the drawings, the reference numeral 10 indicates in its entirety a harvester platform of the type which is inclined upwardly and rearwardly from the cutter bar 11 disposed across the forward end thereof and having a pair of vertical side walls 12, 13 which terminate at the forward ends in dividers 14, 15, respectively.

A harvester reel 16 is supported above the cutter bar for rotation about a transverse axis and includes a suitable central spider 17 having radially extending arms 18, the ends of which carry transversely extending bats 19 for engaging the grain and laying it rearwardly upon the platform 10. The spiders 17 are mounted on a tubular shaft 20 (Figure 4), which receives a central supporting shaft 21, which extends beyond each end of the tubular shaft 20. The reel is driven through a sprocket 22 fixed on the tubular shaft 20 and which is engaged by a drive chain 23 obtaining power from any suitable drive shaft (not shown). The ends of the shaft 21 are journaled in a pair of supporting members or carriages 25, 26 which slide vertically along a pair of supporting standards in the form of rack bars 27, 28, respectively. Each of the rack bars is pivotally mounted by means of a bolt 29 on a bracket 30 at opposite ends of the platform, respectively. The rack bars 27, 28 are in the form of structural angle members positioned with one flange 31 disposed transversely relative to the platform and the other flange 32 extending forwardly therefrom. The forward edge of the flange 32 is provided with a row of teeth 33 forming a rack, which meshes with a pinion 34 rigidly fixed on the shaft 21 by means of a pin 35 (see Figure 4). Thus it will be evident that by rotating the shaft 21, the two pinions 34 will roll upwardly or downwardly along the racks 33 on the two rack bars 27, 28, respectively, thereby raising or lowering the reel and at the same time maintaining it parallel to the cutter bar. For the purpose of rotating the shaft 21, a jacking device, indicated generally by reference numeral 40, is provided in association with one of the slidable carriages 25, which will now be described.

The carriage 25 comprises a plate 41 which lies along the outer side of the flange 32 of the rack bar 27 and has a bearing 43 at its forward end in which the shaft 21 is journaled. The rear edge of the plate 41 is turned inwardly to provide a flange 44 spaced rearwardly from the rear flange 31 of the rack bar to receive the supporting flange 45 of a bracket 46 disposed on the opposite side of the rack bar 27. The flanges 44, 45 of the plate 41 and bracket 46 are rigidly connected together by bolts 47 and a U-shaped strap 48 provides a bifurcated bearing, to which a bracing arm 49 is pivotally connected by a pivot pin 50, extending through aligned apertures 51 in the bearing 48.

The pinion 34 is rotated by means of a control lever 55, the inner end of which is bifurcated to provide a pair of bearing arms 56, 57 journaled on the shaft 21 on opposite sides of the pinion 34, respectively. A ratchet pawl 58 is pivotally mounted between the arms 56, 57 of the lever 55 on a bolt 59 disposed parallel to the shaft 21, and has a dog 60 that engages the teeth of the pinion 34. The pawl 58 has an extension 61 beyond the pivot 59, against which extension bears a compression spring 62, which reacts upon a web portion 63 extending between the arms 56, 57 below the pawl 58. The spring 62 urges the dog 60 into engagement with the teeth of the pinion 34. The ratchet pawl 58 is adapted to lock into the teeth of the pinion 34 while the lever 55 is being raised in a counterclockwise direction as viewed in Figure 5, but ratchets over the teeth of the pinion 34 as the lever 55 is lowered in a clockwise direction of rotation. Thus, by reciprocating the lever 55 up and down, the pinion 34 will be rolled upwardly along the rack bar 27 with each upward stroke of the lever, but during each return stroke of the lever 55 the pawl 58 merely slides over the teeth of the pinion.

The pinion 34 is retained against retrograde movement down the rack bar during the return strokes of the lever 55 by means of a locking pawl 65, which is pivotally mounted by means of a pin 66 on a lug 67 formed integral with the bracket 46. The locking pawl 65 is provided with a dog 68, which is adapted to engage the teeth of the pinion 34 and prevent the latter from downward rolling movement along the rack bar. The dog 68 merely ratchets over the teeth of the pinion 34, however, during upward movements of the lever 55. The pawl 65 is biased toward engagement with the pinion 34 by means of a coil spring 69 disposed in a recessed portion 70 of the bracket 46 and having one end 71 retained behind a web portion 72 of the bracket 46. The other end 73 of the spring 69 is bent outwardly and bears in a groove 74 behind the end of the pawl 65.

It is now evident that as the lever 55 is raised, the dog 60 of pawl 58 engages the teeth of the pinion 34 and turns the latter in a counterclockwise direction as viewed in Figure 5, thereby raising the shaft 21 together with the reel mounted thereon. At the same time, the dog 68 of the locking pawl 65 merely rides over the ends of the teeth of the pinion 34 but when the lever 55 is raised to the position shown in Figure 5, the locking pawl 65 drops into engagement with the tip 75 of the pawl 58, as illustrated in Figure 5. The lever 55 may be moved upwardly from this position, the tip 75 sliding along the underside 76 of the locking pawl 65 until the tip 75 engages the base of the dog 68, thereby arresting the upward movement of the lever in the position shown in Figure 6. This is the limit of upward swinging movement of the lever 55 if a continuous force be applied to raise the lever from its lowest position as shown in Figure 3. This can be done either directly by hand, or by means of a rope 77 or other flexible member, trained over a pulley 78 attached to the upper end of the rack bar 27, and extending from said pulley 78 to any convenient remote operator's position, such as the operator's station on a tractor ahead of the implement. The rope 77 now can be released, and the lever 55 will be returned to its lowest position by means of a coil spring 80, one end of which is hooked into an opening 82 in the end of an arm 81, formed integrally with the lever 55 and extending downwardly therefrom, the other end of the spring 80 being hooked into an eyebolt 83, which is fastened to the plate 41 of the carriage 25. As the lever 55 swings downwardly under the influence of the spring 80, the dog 60 of the ratchet pawl 58 rides over the ends of the teeth of the pinion 34, while the locking pawl 65 holds the pinion 34 against retrograde movement downwardly along the rack bar 27. Another pull on the rope 77 causes the pinion to be rotated another portion of a revolution in the manner described above, so that a succession of actuations of the rope 77 will raise the reel to any desired point.

The reel can be lowered in the following manner: From the upper extreme limit of raising movement of the lever 55 as shown in Figure 6, the lever can be released a short distance until the tip 75 of the ratchet pawl 58 slides away from the bottom surface 76 of the locking pawl 65 at the position indicated in Figure 5. The coil spring 69 then causes the locking pawl 65 to swing inwardly until its outer end 84 contacts the tip 75 of the ratchet pawl 58. Now, if the lever be raised once more, the tip 75 enters a transverse notch 85 disposed adjacent the end 84, whereupon further upward movement of the lever 55, both pawls 58, 65 are raised out of engagement with the pinion 34 by toggle action due to the interengagement of the two pawls, to the position shown in Figure 7. The pinion 34 is now free to roll downwardly along the rack bar 27 and at the same time, the pinion 34 on the opposite end of the shaft 21 rolls down the rack bar 28, thereby lowering the reel but maintaining it level at all times.

By pulling harder yet upon the rope 77, the reel can be arrested in its downward movement by means of a braking action between a brake shoe 86 and the transverse flange 31 of the rack bar 27, as best illustrated in Figure 7. The brake shoe 86 comprises a short length of angle bar, having one flange 87 disposed transversely in slidable engagement with the inside of the flange 31, the other flange 88 lying along the side of the locking pawl 65 on the side opposite the flange 32 of the rack bar. The brake shoe 86 is supported on the pin 66 which supports the locking pawl 65, the edge of the flange 88 being notched, as indicated at 89, to receive the pin 66, as best shown in Figure 7. The notch 89 is long enough to permit the shoe 86 to move to a limited extent toward and away from the flange 31 of the rack bar, which movement is accomplished by engagement of the back side 90 of the locking pawl 65 with the inside of the flange 87 of the shoe. Thus, an upward force against the lever 55, with the pawls interengaged as shown in Figure 7, is transmitted through the pawls against the rear flange 87 of the brake shoe 86, forcing the latter against the rear flange 31 of the rack bar 27, holding the reel against downward movement by the frictional engagement therebetween. Now, releasing the pressure on the rope slightly, releases the brake pressure and permits the carriage 25 to slide downwardly on the rack bar. When the reel reaches the desired position of adjustment, a quick release of the rope will permit the springs 69 and 80 to swing the locking pawl 65 back into engagement with the pinion 34, and return the lever 55 to its lowermost position. A bolt 91, secured within a suitable aperture in the flange 32 of the rack bar, serves as a limit stop to prevent the reel from dropping into engagement with the ground or the cutter bar. A similar bolt 92 on the opposite rack bar 28 serves as a limit stop for the carriage 26.

It will be noted that the spacing of the teeth on the pinion 34 and the proportions of the pawls 58, 65 are such that the tip of the ratchet pawl does not engage the groove or notch 85 in the locking pawl as the lever is first raised, for the dog 68 on the locking pawl 65 rides over the end of the pinion tooth to drop the bottom surface 76 of the locking pawl into engagement with the tip 75. Then when the lever is released slightly, the locking pawl dog 68 seats firmly between the pinion teeth while the dog 69 of the ratchet pawl moves upwardly on one of the pinion teeth until the tip 75 snaps into the groove 85. Therefore, it is evident that a double pull on the rope is required to set the pawls in position for lowering the reel.

I do not intend my invention to be limited to the exact details shown and described herein, except as set forth in the claims which follow.

I claim:

1. For use in a harvester having a platform, the combination of a pair of rack bars adapted to be mounted at opposite sides of said platform, respectively, a member slidably mounted on each rack bar, a pinion journaled on each member in mesh with the rack bar, a shaft interconnecting said pinions, a lever pivotally mounted on one of said supporting members, a rope connected to said lever and adapted to extend to a remote operator's position for swinging said lever, spring means for returning said lever to a normal position, and ratchet mechanism engageable with the associated pinion and operable by reciprocating said lever to rotate said shaft, thereby causing said pinions to roll up said rack bars.

2. A jacking device comprising a pair of relatively movable members, a reciprocative jacking element effecting relative movement between said members responsive to movement of said element in one direction, and means for retaining said members in relatively fixed position while said element is moved in the other direction, said retaining means being engageable by said jacking element in one position of the latter to release said retaining means, and braking means mounted on one of said members and engageable with the other of said members under control of said jacking element after releasing said retaining means, to control retrograde relative movement.

3. A jacking device comprising a pair of relatively movable members, a jacking mechanism including a reciprocative lever effecting relative movement between said members responsive to movement of said lever in one direction and providing a mechanical advantage between said lever and said mechanism, and means for retaining said members in relatively fixed position while said lever is moved in the other direction comprising a pawl pivotally mounted on one of said members, said pawl being engageable with cooperative means on said lever in one position of the latter to release said retaining means to permit relative movement between said members in the reverse direction, and braking means mounted on one of said members and engageable with the other of said members under control of said lever after releasing said pawl, to control retrograde relative movement.

4. A jacking device comprising a pair of relatively movable members, a jacking mechanism including a reciprocative lever effecting relative movement between said members responsive to movement of said lever in one direction and providing a mechanical advantage between said lever and said mechanism, and means for retaining said members in relatively fixed position while said lever is moved in the other direction comprising a pawl pivotally mounted on one of said members, said pawl being engageable with cooperative means on said lever in one position of the latter to release said retaining means to permit relative movement between said members in the reverse direction, and braking means mounted on one of said members and engageable with the other of said members, said braking means being actuated through said pawl under control of said lever when the latter has been moved to a position disengaging said pawl.

5. A jacking device comprising a pair of relatively movable members, ratchet mechanism including a toothed element, a pair of pawls movable into and out of engagement therewith, a reciprocative lever on which one of said pawls is movably mounted and adapted to effect relative movement of said members responsive to movement of said lever in one direction, the other of said pawls serving to restrain said members against retrograde movement, said restraining pawl being engageable with a part on said lever when the latter is moved to a certain position to release said restraining pawl to permit retrograde movement, and braking means under control of said lever for restraining said retrograde movement after said restraining pawl has been released by said lever.

6. A jacking device comprising a rack bar, a member slidable thereon, a pinion journaled on said member and disposed in mesh with said rack bar, a lever pivoted on said slidable member on the axis of said pinion, a pawl pivoted on said lever and adapted to engage said pinion to turn the latter when the lever is swung in one direction, a locking pawl pivoted on said member and engageable with said pinion to restrain the latter against retrograde movement along said rack, said locking pawl being engageable by a part on said lever when the latter is moved to a certain position to release said pawl and thus permit retrograde movement, and braking means mounted on said slidable member and engageable with said rack for controlling said retrograde movement, said braking means being engageable responsive to movement of said locking pawl away from engagement with said pinion.

7. A jacking device comprising a pair of relatively movable members, ratchet mechanism associated therewith including a toothed element, a pair of opposed pawls biased in engagement therewith, a reciprocative lever pivotally mounted on one of said members, one of said pawls being pivotally mounted on said lever and engageable with said toothed element to effect relative movement between said members when said lever is moved in one direction, the other of said pawls being mounted on said one member and engageable with said toothed element to restrain said members against retrograde movement, said pawls being interengageable under control of said lever to release both pawls from engagement with said toothed element thereby permitting retrograde movement, said interengaged pawls being adapted to transmit a braking force from said lever to the other of said members to control said retrograde movement.

8. A jacking device as set forth in claim 7, including the further provision of a brake shoe disposed in slidable engagement with said other member and connected with said restraining pawl for actuation thereby.

9. A jacking device comprising a rack bar, a member slidable thereon, a pinion journaled on said member and disposed in mesh with said rack bar, a lever pivoted on said slidable member on the axis of said pinion, a pawl pivoted on said lever and adapted to engage said pinion to turn the latter when the lever is swung in one direction, a locking pawl pivoted on said member and engageable with said pinion to restrain the latter against retrograde movement along said rack, said pawls extending toward each other from their pivot connections and are adapted to interengage substantially end to end to form a toggle when said lever is moved to a certain position to release both pawls from said pinion, said toggle being shiftable by said lever toward said rack bar for transmitting a braking force therebetween for controlling retrograde movement.

10. A jacking device as set forth in claim 9, including the further provision of a brake shoe movably mounted on said slidable member and connected with said restraining pawl serving as means for limiting the movement of said lever when disengaging said pawls from said pinion and transmitting a braking force through said lever and toggle against said rack bar.

11. A jacking device comprising a rack bar, a member slidable thereon, a pinion journaled on said member and disposed in mesh with said rack bar, a lever pivoted on said slidable member on the axis of said pinion, a pawl pivoted on said lever and biased into engagement with said pinion to turn the latter when the lever is swung in one direction, a locking pawl pivoted on said member and biased into engagement with said pinion to restrain the latter against retrograde movement along said rack, said locking pawl being so constructed and arranged that as said lever approaches the end of its range of movement in said one direction, said locking pawl falls into overlapping relation with said lever mounted pawl and has a portion serving as a stop for the latter to prevent further swinging movement of the lever at a certain terminal position in which said locking pawl is slightly out of seating engagement with said pinion, whereafter a slight movement of the lever in the reverse direction separates said pawls and allows said locking pawl to drop into full seating engagement, whereupon subsequent movement of said lever in said one direction causes said pawls to interengage and form a toggle, providing for disengagement of both pawls from said pinion by further movement of said lever.

12. A jacking device comprising a rack bar, a member slidable thereon, a pinion journaled on said member and disposed in mesh with said rack bar, a lever pivoted on said slidable member on the axis of said pinion, a pawl pivoted on said lever and biased into engagement with said pinion to turn the latter when the lever is swung in one direction, a locking pawl pivoted on said member and biased into engagement with said pinion to restrain the latter against retrograde movement along said rack, said locking pawl being so constructed and arranged that as said lever approaches the end of its range of movement in said one direction, said locking pawl falls into overlapping relation to said lever mounted pawl and has a portion serving as a stop for the latter to prevent further swinging movement of the lever, said pawls being separable by moving the lever slightly in the reverse direction causing said locking pawl to drop into substantially end to end engagement with said lever mounted pawl to form a toggle, whereby subsequent movement of said lever in said one direction releases both pawls from said pinion.

13. A jacking device as set forth in claim 12, including the further provision of a braking shoe associated with said locking pawl and shiftable by the latter into engagement with said rack bar as the locking pawl is forced by said lever away from engagement with said pinion.

14. In combination, a supporting standard, a load supporting member engaging said standard and shiftable therealong, a jacking device interconnecting said standard and said member and including ratchet mechanism having a reciprocable lever and a rope connected thereto and extending to a remote operating position, said ratchet mechanism being adapted to raise said supporting member in small increments relative to said standard responsive to successive actuations of said lever by pulls on said rope, and to lower said supporting member responsive to a reciprocation of said lever through appreciably less than its complete range of movement under control of said rope, and spring means for returning said lever after each actuation.

15. In combination, a supporting standard, a load supporting member engaging said standard and shiftable up or down relative to said standard, a jacking device interconnecting said standard and said member, said jacking device including ratchet mechanism having a reciprocable lever, a rope attached to the latter for remote control and spring means for returning said lever after each actuation, said ratchet mechanism being actuable by successive pulls on said rope to jack said member upwardly in small increments, and having means responsive to a manipulation of said rope at the end of any actuation of said lever for disabling said ratchet mechanism and permitting said member to slide downwardly on said standard.

16. In combination a supporting standard, a load supporting member engaging said standard and shiftable up or down relative to said standard, brake mechanism interengageable between said supporting member and said standard, a jacking device interconnecting said standard and said member, said jacking device including ratchet mechanism having a reciprocable lever, a rope attached to the latter for remote control and spring means for returning said lever after each actuation, said ratchet mechanism being actuable by successive pulls on said rope to jack said member upwardly in small increments, and having means responsive to a manipulation of said rope at the end of any actuation of said lever for disabling said ratchet mechanism and actuating said brake mechanism to hold said supporting member relative to said standard.

17. In combination a supporting standard, a supporting member engaging said standard and shiftable up or down relative to said standard, a jacking device interconnecting said standard and said member, said jacking device including a reciprocable lever pivoted on said supporting member, a pair of pawls pivoted on said lever and said supporting member, respectively, and a toothed element engageable by said pawls and actuated thereby responsive to reciprocations of said lever to raise said supporting member, a rope attached to said lever for swinging the lever in one direction and spring means for returning the lever, said pawls extending toward each other from their pivot connections and being engageable end to end by manipulating said rope thereby forming a toggle, whereby applying tension on said rope urges said pawls together disengages both pawls from said toothed member permitting said supporting member to descend.

18. In combination a supporting standard, a load supporting member engaging said standard and shiftable up or down relative to said standard, a jacking device interconnecting said standard and said member, said jacking device including a reciprocable lever pivoted on said supporting member, a pair of pawls pivoted on said lever and said supporting member, respectively, and a toothed element engageable by said pawls and actuated thereby responsive to reciprocations of said lever to raise said supporting member, a rope attached to said lever for swinging the lever in one direction and spring means for returning the lever, said pawls extending toward each other from their pivot connections and being engageable end to end by manipulating said rope thereby forming a toggle, and braking means interconnected between said supporting member and said standard and engageable by said toggle and responsive to movement of one of said pawls out of engagement with said toothed element for applying said braking means, whereby applying tension on said rope urges said pawls together disengaging both pawls from said toothed element and applies force on said braking means and relaxing the tension in said rope first decreases the force on said braking means allowing said load supporting member to descend, while further relaxing the tension in said rope separates said pawls and permits them to engage said toothed element to lock said supporting member in adjusted position.

19. In combination, a supporting standard, a load supporting member engaging said standard and shiftable up or down relative to said standard, a jacking device interconnecting said standard and said member, said jacking device including ratchet mechanism having a reciprocable lever, a rope attached to the latter for remote control and spring means for returning said lever after each actuation, said ratchet mechanism being actuable by successive pulls and releases of said rope throughout its range of reciprocation to jack said member upwardly in small increments, and having means responsive to a reciprocative movement of said lever through appreciably less than its complete range of movement for disabling said ratchet mechanism under control of said rope and permitting said member to slide downwardly on said standard.

20. In combination, a supporting standard, a load supporting member engaging said standard and shiftable up or down relative to said standard, brake mechanism interengageable between said supporting member and said standard, a jacking device interconnecting said standard and said member, said jacking device including ratchet mechanism having a reciprocable lever, a rope attached to the latter for remote control and spring means for returning said lever after each actuation, said ratchet mechanism being actuable by successive pulls and releases of said rope throughout its range of reciprocation to jack said member upwardly in small increments, and having means responsive to a reciprocative movement of said lever through appreciably less than its complete range of movement for disabling said ratchet mechanism under control of said rope and permitting said member to slide downwardly on said standard, and means responsive to an increased tension in said rope for actuating said brake mechanism to hold said member against downward movement relative to said standard.

ORA F. LOHSE.